United States Patent Office 3,427,378
Patented Feb. 11, 1969

3,427,378
SUSTAINED RELEASE ENCAPSULATED
FORMULA
Norman Leo Henderson, Park Ridge, N.J., and Louis
Nasir Elowe, Pearl River, N.Y., assignors to American
Cyanamid Company, Stamford, Conn., a corporation
of Maine
No Drawing. Filed Feb. 12, 1965, Ser. No. 432,410
U.S. Cl. 424—14                          6 Claims
Int. Cl. A61k 9/04, 27/12

ABSTRACT OF THE DISCLOSURE

A sustained release package dosage form in a substantially completely filled gelatin capsule, the package containing a mixture of a hydrophilic gum and an ungranulated medicament in the proper prescribed therapeutic dosage, the proportion of the gum being from 70% to 99% of the total weight of the mixture.

BACKGROUND OF THE INVENTION

A serious problem is presented by medicaments which are to be ingested orally. When such a medicament in tablet or capsule form is swallowed, it dissolves very rapidly in the stomach and may produce useful blood levels. However, these blood levels begin to fall off and so it becomes necessary to swallow another dose in a few hours. This presents a problem of great inconvenience to the patient and where it is desirable to maintain a reasonable blood level for a considerable time the patient has to wake up or be waked up in the night which is extremely annoying. Another problem is also presented by the fact that some medicaments may be irritating to the stomach or may produce unpleasant or undesirable side affects when they dissolve too rapidly and produce excessive blood level peaks.

The serious problem of providing for a gradual or sustained release of medicaments has resulted in intensive research work which has produced a number of solutions. A few illustrations include so-called enteric coatings which are applied to a granulation or a tablet. These coatings either do not dissolve in the gastric juices or dissolve very slowly so that the medicament is released in the intestines. Another method provides the coating of medicaments in the form of small seeds of different size with various waxes or fats. The seeds are then incorporated into another dosage form such as, for example, a capsule, and the rate of release varies with the size of the seeds. Medicaments from some of the particles are released fairly promptly and gradually from others. Another method involves the incorporation of the desired medicament in a molten medium of fat, wax, or plastic material. The mixture is then cooled to form a cake which is granulated, tabletted or encapsulated. Another method recently developed is to adsorb the medicament on ion exchange resins. It has also been proposed to granulate the medicaments with hydrophilic gums. The granules can then be tabletted to form sustained release tablets.

All of the methods employed before, of which the above are typical illustrations, involved lengthy or elaborate preparatory procedures and are quite expensive. Therefore, although satisfactory sustained release dosage forms have been produced they leave a great deal to be desired in the way of cost and ease of preparation. It is with a much cheaper and simpler method and a new product which provides sustained release with great effectiveness that the present invention deals.

SUMMARY OF THE INVENTION

The present invention uses a dry mixture of finely divided medicament or medicaments and certain hydrophilic gums which swell on contact with the gastric juice. This mixture, however, must be filled into capsules such as hard or soft gelatin capsules, and the capsules must be filled substantially to capacity. The results obtained are quite surprising because if the mixture is used without encapsulation, no sustained release is obtained. It is not intended to limit the present invention to any theory of why a mixture which gives no sustained release when ingested directly gives excellent sustained release when filled into capsules. It is not known why the same mixture behaves so differently in a capsule which itself dissolves quite rapidly in the gastric juice. It is known that this surprising result takes place but the reasons why it occurs are not known and so the invention is not intended to be based on any particular theory of why the drastically different results are obtained with the capsules.

Although the encapsulation and filling substantially to capacity are the critical features of the present invention, the particular proportions of hydrophilic gum to medicament are not. In general, the larger the percentage of the gum the slower the release. This is a further advantage of the present invention because it makes possible an accurate release rate which can differ because with some medicaments one rate is preferable while other medicaments require a different release rate. The present invention permits adjusting release rate accurately. In general, the percentage of hydrophilic gum to medicament will fall in a range between 70 and 99%. A preferred concentration range is between 85 and 98%. The exact percentage in the range is determined, of course, by the release rate desired.

The present invention may be used with a wide range of hydrophilic gums which tend to swell in the gastric juice. The preferred gum is an alkali metal alginate such as sodium alginate. This gives excellent results but of course only when the mixture with the medicament is encapsulated. Sodium alginate is the preferred hydrophilic gum but others may be used such as guar gum, polyoxyethylene resins and ethyl cellulose.

The particular medicament or mixtures of medicaments to be used in the present invention include any of the medicaments which are suitable for oral use. In fact the present invention does not limit itself to any particular medicament or medicaments. This is an important advantage as it makes the process and product of the present invention quite generally applicable. In the specific examples, which will follow, and in which the proportions are by weight unless otherwise specified, certain typical medicaments will be illustrated. These examples are intended only to be illustrations and the invention is not limited to the particular gum or the particular medicament or medicaments described therein. In the examples, release rates will be specified for gastric juices and/or intestinal fluids. As it is impossible to determine exact release rates by in vivo tests and in order to make exact comparisons synthetic solutions are used as set forth in the U.S. Pharmacoepia, vol. XVI and referred to therein as "simulated gastric fluid" and "simulated intestinal fluid," respectively.

The present invention is directed to a package dosage unit which releases medicament at certain rates. It is not concerned with any new or different prescribed therapeutic safe dosages. These are required by law to be determined by legally set up bodies or classes of professional men, such as physicians. The legally prescribed dosage varies with each drug, and the particular dosage forms no part of the present invention.

DESCRIPTION OF THE PREFERRED EMBODIMENT

Example I 8 parts of chlorpheniramine maleate and 242 parts of sodium alginate were blended for 30 minutes. The particle size of each material was minus 60 mesh. The blend represented a sodium alginate percentage of 96.8 percent.

The blended powder was divided into two parts, one of which was filled into #1 clear, hard shell, gelatin capsules. Each capsule was filled substantially full and contained 8 mg. of the medicament and 242 mg. of the sodium alginate.

The filled capsules and the uncapsulated mixture were then tested side by side for sustained release using a test procedure of agitating in a simulated gastric fluid for two hours and then transferring to simulated intestinal fluid and agitating therein for an additional five hours. Samples of the fluids were removed at predetermined intervals and assayed in order to determine the rate of release in each case. The following table shows the rates of release. The figures being cumulative.

| Time, in hours | Capsules, percent released | Mixture percent released |
|---|---|---|
| ½ | 12 | 92 |
| 2 | 40 | |
| 4½ | 59 | |
| 7 | 87 | |

Example II

The same medicament powder and sodium alginate powder of the same particle size as in Example I were blended. However, the proportions were 15 parts of the chlorpheniramine maleate and 230 parts of sodium alginate. This corresponded to 94 percent sodium alginate. All of the product was filled into capsules as described in Example I, and they were tested by the same procedure. The following table shows the rate of release.

| Time in hours: | Percent released |
|---|---|
| ½ | 30 |
| 2 | 54 |
| 4½ | 68 |
| 7 | 93 |
| Residue | 6 |
| Recovery | 99 |

Example III

The procedure of Example II was repeated but the proportions of medicament to sodium alginate were 30 parts to 220 parts corresponding to 88 percent of the sodium alginate. The capsules were again tested as described in Example I and the release is shown in the following table:

| Time in hours: | Percent released |
|---|---|
| ½ | 19 |
| 2 | 52 |
| 4½ | 64 |
| 7 | 89 |
| Residue | 10 |
| Recovery | 99 |

Example IV

The procedure of Example II was repeated but the powder mixture was 8 parts of chlorpheniramine maleate, 25 parts of phenylephrine base and 267 parts of sodium alginate. This corresponds to 89 percent of the sodium alginate. The capsules used were #0 instead #1 and each capsule contained 300 mg. of the mixture. The capsules were tested as described in conjunction with Example I and the following table shows the release for each medicament:

| Time, in hours | Percent chlorpheniramine released | Percent phenylephrine released |
|---|---|---|
| ½ | 14 | 25 |
| 2 | 51 | 62 |
| 4½ | 61 | 76 |
| 7 | 87 | 92 |

Example V

The procedure of Example II was repeated using guar gum, as the hydrophilic gum. However, the proportions were 15 parts of the chlorpheniramine maleate and 600 parts of guar gum. This corresponded to 97.5% guar gum. All of the product was filled into No. 0 capsules as described in Example I and they were tested by the same procedure. Satisfactory release rates were obtained with this formation.

Example VI

The procedure of Example II was repeated using polyoxyethylene resin 300 cps. as the hydrophilic gum. However, the proportions were 15 parts of the chlorpheniramine maleate and 500 parts of polyoxyethylene resin. This corresponded to 97.1% polyoxyethylene resin. All of the product was filled with No. 0 capsules as described in Example I and they were tested by the same procedure. Satisfactory release rates were obtained with this formulation.

Example VII

The procedure of Example II was repeated using ethylcellulose 100 cps., as the hydrophilic gum. However the proportions were 15 parts of the chlorpheniramine maleate and 370 parts of ethylcellulose. This corresponded to 95.9% ethylcellulose. All of the product was filled into No. 0 capsules as described in Example I and they were tested by the same procedure. Satisfactory release rates were obtained with this formulation.

We claim:

1. A sustained release medicament package comprising a legally prescribed, safe therapeutic dose mixture of non-granulated finely divided medicament and hydrophilic gum capable of swelling in gastric and intestinal fluids, the gum amounting to 70% to 99% of the total weight of the mix, said mix having not been compressed or molded into tablet form and the final dosage form being in the form of soluble gelatin capsules substantially filled with said mixture.

2. A capsule according to claim 1 in which the proportion of the hydrophilic gum capable of swelling in gastric and intestinal fluids being from 85 to 98% of the weight of the mix.

3. A capsule according to claim 1 in which the hydrophilic gum is sodium alginate.

4. A capsule according to claim 2 in which the hydrophilic gum is sodium alginate.

5. A capsule according to claim 1 in which the hydrophilic gum is selected from the group consisting of sodium alginate, guar gum, polyoxyethylene resins and ethyl cellulose.

6. A capsule according to claim 2 in which the hydrophilic gum is selected from the group consisting of sodium alginate, guar gum, polyoxyethylene resins and ethyl cellulose.

References Cited

UNITED STATES PATENTS 3,065,143  11/1962  Christenson et al. _____ 167—82

LEWIS GOTTS, *Primary Examiner.*

S. K. ROSE, *Assistant Examiner.*